United States Patent [19]

Bednar

[11] 4,368,651

[45] Jan. 18, 1983

[54] MULTISTAGE AUTOMATIC PLANETARY TRANSMISSION GEARING

[75] Inventor: Jiri Bednar, Povazska Bystrica, Czechoslovakia

[73] Assignee: Povazske strojarne, narodni podnik, Povazska Bystrica, Czechoslovakia

[21] Appl. No.: 845,313

[22] Filed: Oct. 25, 1977

[30] Foreign Application Priority Data

Oct. 22, 1976 [CS] Czechoslovakia .................. 6806

[51] Int. Cl.³ ............................................. F16H 3/74
[52] U.S. Cl. ................................ 74/752 E; 74/336.5
[58] Field of Search ................... 74/802, 750, 752 E, 74/859, 336, 337; 192/103 B, 105 CE, 105 CD

[56] References Cited

U.S. PATENT DOCUMENTS

| | | | |
|---|---|---|---|
| 3,129,610 | 4/1964 | Ashfield | 74/336 |
| 3,212,348 | 10/1965 | Atsumi | 74/336 |
| 3,768,337 | 10/1973 | Racicot et al. | 74/75 Z E |

*Primary Examiner*—Larry Jones

[57] ABSTRACT

Multistage automatic planetary transmission gearing, particularly suitable for passenger cars, using for improvement of conditions in the course of gear changes a mechanism of feedback coupling, comprising an output part, a regulating part and a rest stop.

5 Claims, 3 Drawing Figures

MULTISTAGE AUTOMATIC PLANETARY TRANSMISSION GEARING

This application is related to application Ser. No. 845,590, filed Oct. 25, 1977, now abandoned, and to the continuation-in-part thereof, Ser. No. 888,625, filed Mar. 21, 1978, now U.S. Pat. No. 4,165,657.

BACKGROUND OF THE INVENTION

This invention relates to a multistage automatic planetary transmission gearing suitable for motor cars, particularly passenger cars, with the changing of gear stages being effected by centrifugal multiple plate disk clutches.

Known multistage automatic transmission gearings in which gear stages are changed by means of centrifugal clutches are simple, but their operating properties are not fully satisfactory, particularly at the beginning of gear stage changing at uniform speed of the vehicle without regard to load, and also the mutual dependence of the first phase of gear changing between the speed $v_1$ to $v_2$ ($v_1$ being the speed at which a forceless contact of friction parts of the clutch occurs, and $v_2$ being the speed at which the gear change clutch transmits a part of the torque) and in the second phase of gear stage changing within the range of speeds $v_2$ to $v_3$ ($v_3$ being the speed at which a rigid coupling of the gear change coupling takes place) the second phase of changing taking place at a reduction of the revolutions of the engine from $n_2$ to $n_3$. The steepness of the function $n_2$–$n_3$ in dependence on time must not jeopardize the continuity of changing; wherein the range of speeds $v_1$ to $v_3$, where the efficiency of transmission of power is reduced due to slippage of the gear change clutch, inefficiency should not increase proportionally. These prior transmission gears are not suitable for more than two speed stages.

In automatic planetary transmission gearing in which the gear changing is accomplished by oil controlled clutches in the first and second phase of changing on the continuity of changing within a chosen narrow speed range $v_1$ to $v_3$ are eliminated by a hydrodynamic starting clutch, or by a hydrodynamic torque converter, at the price of a reduced efficiency of power transmission within the whole speed range of the vehicle except for the highest speed stage if the hydrodynamic element is at the highest speed stage, and at the price of higher costs and complexity of the transmission gear if the hydrodynamic element is connected to the highest speed stage. In the latter case fuel consumption is affected unfavorably and the operating properties are secured by rather hydraulic complicated and in recent times also electronic control means, the parts of which are costly and demanding as to technology and service.

SUMMARY OF THE INVENTION

It is an object of this invention to provide an automatic multistage planetary transmission gearing, wherein the said drawbacks in the course of gear changes are for the major part eliminated, and which is less expensive and more easily manufactured than actually used in prior transmission gearings of the same general type.

According to this invention the drum of the gear change clutch in each stage containing a planetary transmission gearing unit, such drum being firmly connected to the output gear of the planetary gearing, is provided with a mechanism for feedback coupling, comprising an output part, a regulating part and a rest stop. The output part comprises carrier arms, firmly connected to the input gear of the following planetary gear unit or to the output shaft of the transmission gearing, and an output arm of swinging carriers, suspended on bolts fixed to the drum of the gear change clutch. The contact faces on the output arms of said swinging carriers engage carrier arms so, that due to the force transmitted via the output arms to the carrier arms according to the magnitude of the torque at the output of the planetary gear unit in question, or of following planetary gear units, the effect of the centrifugal force of centrifugal weights and of guiding arms of the swinging carrier is reduced, thus controlling the regulating part so that increased slippage through the gear change clutch then takes place. The regulating part comprises centrifugal weights guided by guiding arms of swinging carriers, a controlled disk, and a return spring, by the action of which the centrifugal weights are clamped between an inclined surface of the controlled disk and the drum of the gear change clutch.

Among the advantages of the multistage automatic planetary transmission gearing according to this invention are its simplicity and low manufacturing costs, as well as advantageous operating characteristics.

DESCRIPTION OF THE DRAWINGS

The attached drawings illustrate a preferred embodiment of the invention together with a diagram indicating its properties in operation.

DESCRIPTION OF PREFERRED EMBODIMENT

Figure 1:
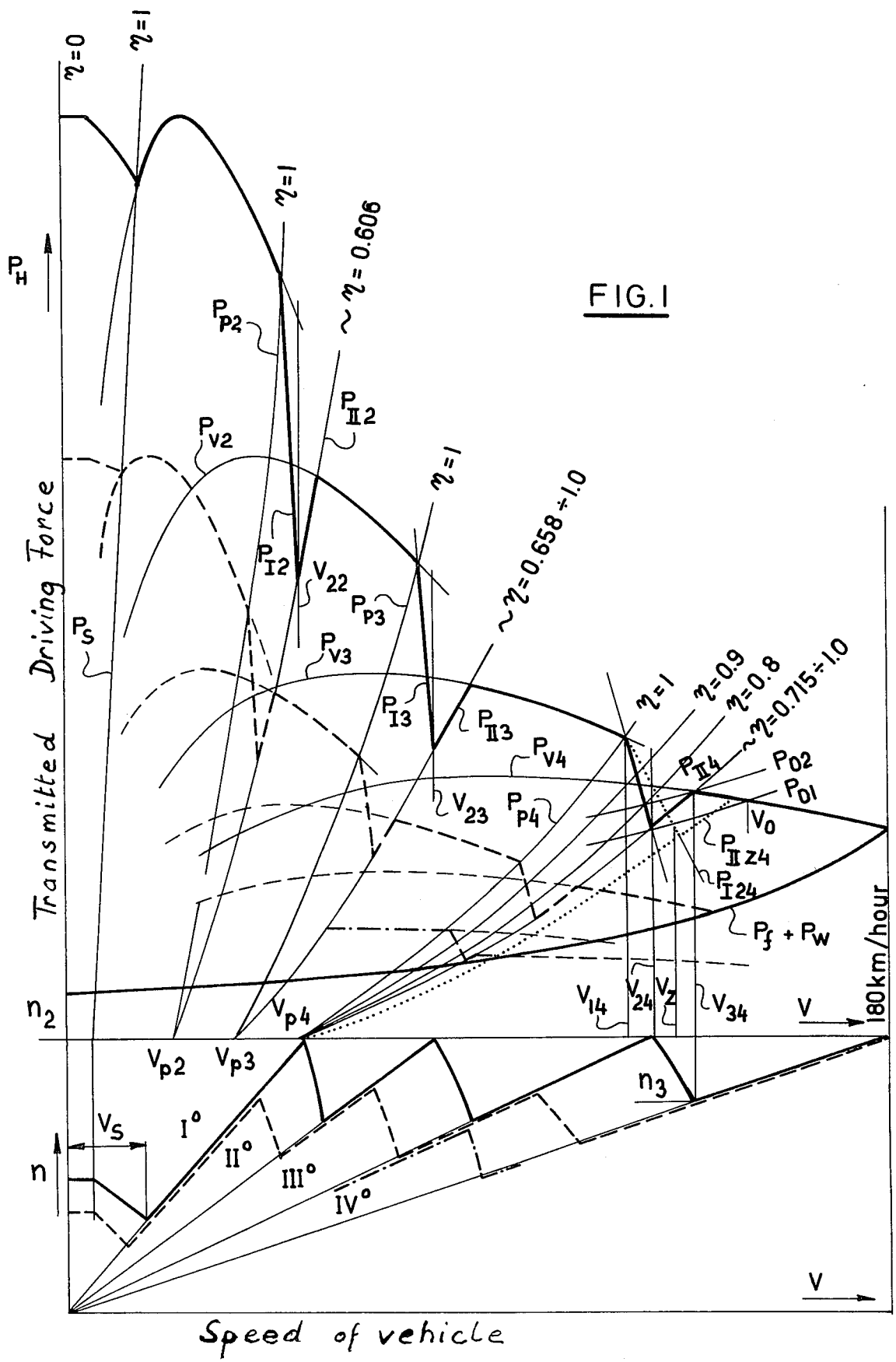
FIG. 1 shows the course of transmitted driving forces $P_H$, of the driving resistances $P_f + P_w$, of the speed of revolution n of the motor and of the efficiency in dependence on the speed v of the vehicle for a four-stage transmission gearing.

FIG. 1 shows the resultant courses of the driving forces for different throttling of the engine fuel for a narrow range of speeds of the transmitted power at reduced efficiency, where the efficiency $\eta$ (eta) is reduced from the value $\eta = 1$ on the curve $P_{pk}$ to the value $\eta = i_k/[i\,(k-1)]$ on the curve $P_{IIk}$ at a speed of $v_2$, whereby the driving forces shown on curve $P_{IIk}$ cannot equalize the driving resistances at an efficiency other than $\eta = 1$, as the course of $P_{IIk}$ increases with a higher speed of the vehicle more steeply than the course of the driving resistances $P_o = (P_f + P_w) + P_z$, where $P_z$ is an increase of driving resistances due to wind or upgrade driving. At the lowest efficiency $\eta$, (for instance for driving resistances $P_{o1}$ at full load of the motor at a speed $v_{24}$) driving is possible only theoretically, as substantially increased driving resistances $P_{o1}$ at a high speed $v_{24} = 128.6$ km/h of the vehicle could be overcome solely on a long straight road with a uniform incline; at higher efficiency a slight reduction of driving resistances, on the other hand, would cause an equalization of driving resistances with driving forces at a higher speed, namely $v_o$, where the efficiency of transmission of power $\eta = 1$, and the vehicle has in the fourth transmission stage at the reduced speed $v_{34}$ a reserve of driving power for overcoming increased driving resistances $P_{O2}$. Thus the range of speeds of the vehicle $v_{24}$ to $v_{34}$ for a constant opening of the throttle is not stable, and a constant speed can be achieved within this range only by a reduction of the supply of fuel to the engine and at an efficiency of 100%.

Theoretically a heating of the gear change clutch and a reduction of the coefficient of friction takes place in case of a longer drive at the speed $v_{24}$, in consequence thereof the constant of the gear change clutch is reduced to $k_{s4z}$ and the coefficient of feedback coupling is reduced to $x_{4z} - (k_{s4z}/k_{s3})$ so that with changed courses of forces of the I phase $P_{Iz4}$ and of the II phase $P_{IIz4}$, the driving resistances equalize with the driving force $P_{Iz4}$ at a slightly increased speed $v_z$ and with an increased efficiency $\eta$. In addition, the mutual independence of the courses of the I and II transmission phases do not require any solution of the continuity of gear change by the introduction of a hydrodynamic element in front of the transmission gearing, a simple centrifugal starting clutch being sufficient. Such starting clutch slips solely within the narrow range of speeds from 0 to $v_s$, whereby for a reduced load the speed $v_s$ drops along the curve $P_s$. At a speed higher than $v_s$ the starting clutch is rigidly connected, which equally contributes to a reduction of fuel consumption and, with the exception of the speed range in the course of gear change at load, where the efficiency of transmission of power is automatically reduced, the multistage automatic planetary transmission gearing does not worsen the dynamic properties of the vehicle. The courses of $P_{pk}$ and $P_{IIk}$ secure the so-called "kick-down effect" (an automatic gear change to a lower speed stage at sudden actuation of the gas pedal, for instance, in case of overtaking) within an arbitrary speed range, limited solely by the courses of $P_{vk}$, as it is, for instance, possible to select the speed $v_{p14}$ so that a sudden actuation of the gas pedal causes a gear change from the fourth to the first speed stage. Another advantage is, that in case of a selection of $$x_k \geq \frac{i(k-1)}{i_k} - 1,$$

any value of the torque is transmitted from the transmission gearing at a speed surpassing $v_{p14}$ via the fourth speed stage; for a suitable selection of $v_{p14}$ this is advantageous for an emergency starting of the motor by towing the vehicle, or possibly in going down-slope without any other arrangement, since the driven part of the starting clutch is provided with centrifugal weights. These in addition reduce the speed of the vehicle, the starting clutch being rigidly connected without reduction of the achievable force in the course of starting, resulting in a reduction of fuel consumption, particularly when driving in a town.

FIG. 1 shows only the part of the course of the efficiency where it drops in the course of gear change due to slipping of the gear change clutch. The transmission ratios $i_k$ of individual stages have been chosen as follows:
$i_1 = 3.52$
$i_2 = 2.23$
$i_3 = 1.4$
$i_4 = 1$ The courses of driving forces $P_H$ and of the speed of revolution n of the motor are shown in full lines for a fully open throttle condition, by a dash line for a partly open throttle condition, and by a dot-dash line for a minimum opening of the throttle, in which, in the case of a drive at level without a wind a gear change from the third to the fourth speed stage takes place. The course of the driving force $P_{Ik}$ in dependence on the speed of the vehicle at gear change to the $k^{th}$ transmission stage in the I phase of gear change is determined by the equation:

$$P_{Ik} = \frac{P_{v(k-1)} - k_{sk}(v_{2k}^2 - v^2) - P_{2k}\left(\frac{i(k-1)}{i_k - 1} + x_k\right)}{1 - x_k}$$

where:
$P_{v(k-1)}$ is the course of the driving force to the $(k-1)^{st}$ speed stage from the torque of the motor in dependence on the speed v of the vehicle,
$k_{sk}$ is the constant of the clutch of the $k^{th}$ stage,
$P_{2K}$ is the driving force of the $k^{th}$ transmission stage at the speed $v_{2K}$ at the end of the I phase of gear change and at a speed of revolution $n_2$ of the motor, and
$x_k$ is the coefficient of feedback coupling characterizing the change $\Delta P_s$ of the driving force transmitted by the gear change clutch at a change $\Delta P$ of the driving force at the output of the planetary transmission gear, so that $$\Delta P_s = \Delta P \cdot x_k$$

The course of the driving force $P_{IIk}$ in the course of the II phase of gear change in dependence on the speed v of the vehicle is:

$$P_{IIk} = P_{2k} - \frac{k_{sk}(v_{2k}^2 - v^2)}{\frac{i(k-1)}{i_k} - 1} = x_k$$

The course of the driving force $P_{pk}$, where the I phase of gear change starts at a speed v is:

$$P_{pk} = \frac{k_{sk}(v^2 - v_{pk}^2)}{x_k}$$

where $v_{pk}$ is the speed at which the I phase of gear change starts at zero load.

The physical significance of the constant $k_{sk}$ of the gear change clutch follows from the equation:

$$k_{sk} = \frac{P_{2K}}{v_{2k}^2 - v_{Itk}^2} \text{ where}$$

$v_{Itk}$ is the speed of the vehicle, where the I phase of gear change would proceed at $k_{sk}$, $P_{2k}$ and $v_{2k}$ without action of the feedback coupling. The constant of the clutch is determined by the equation:

$$k_{sk} = \frac{P_{2k}\left(\frac{i(k-1) - 1 + x_k}{i_k}\right)}{v_{2k}^2 - v_{pk}^2}.$$

The efficiency of transmission of power in the I phase of gear change is:

$$\eta I = \frac{P_{Ik}}{P_{V(k-1)}}$$

The efficiency of transmission of power in the II phase of gear change is $$\eta II = \frac{n_{II}}{n}$$

Figure 2:
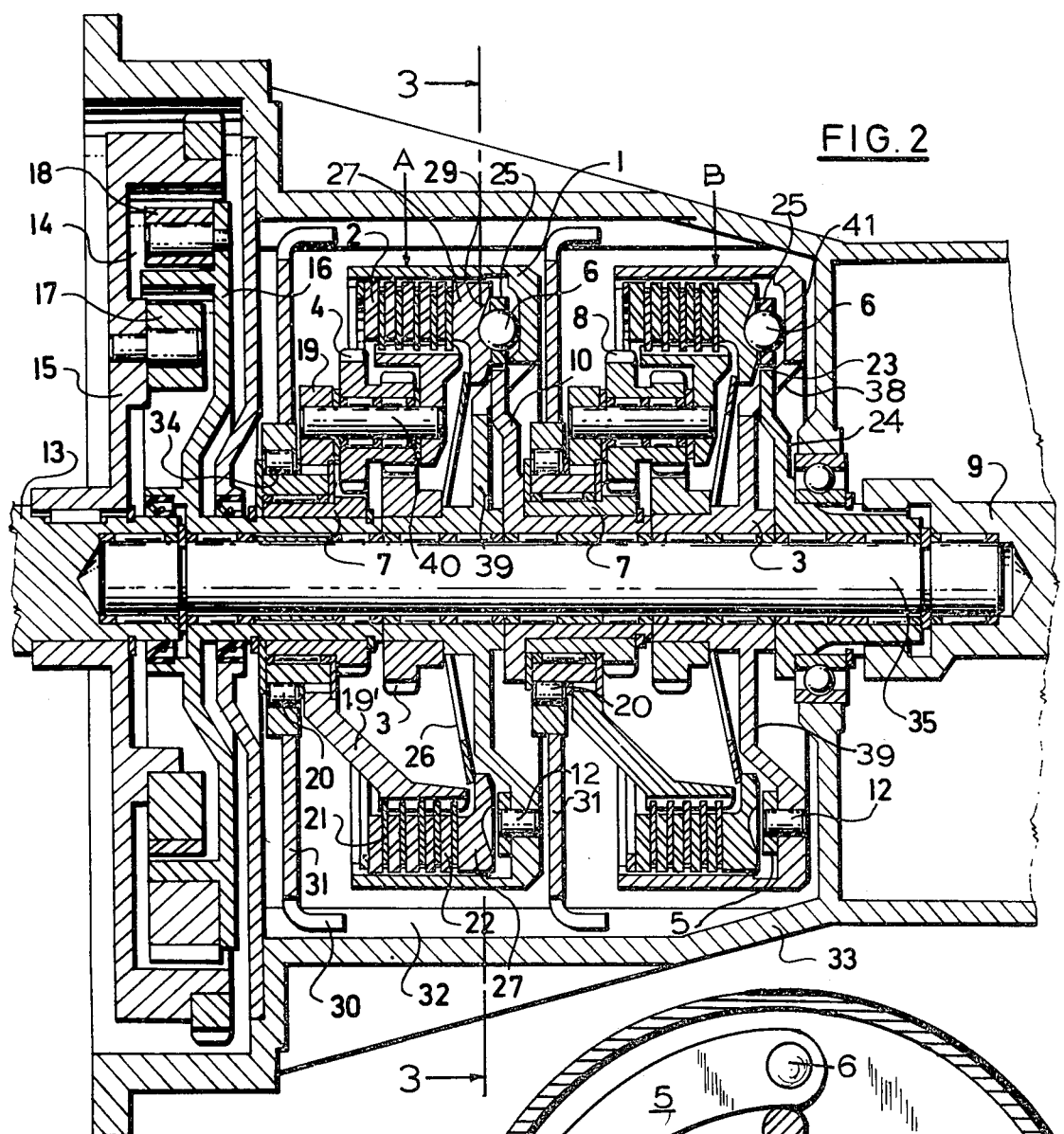
FIG. 2 is a view in longitudinal axial section of an embodiment of the gearing of this invention for a two-stage automatic planetary transmission gearing.
Figure 3:
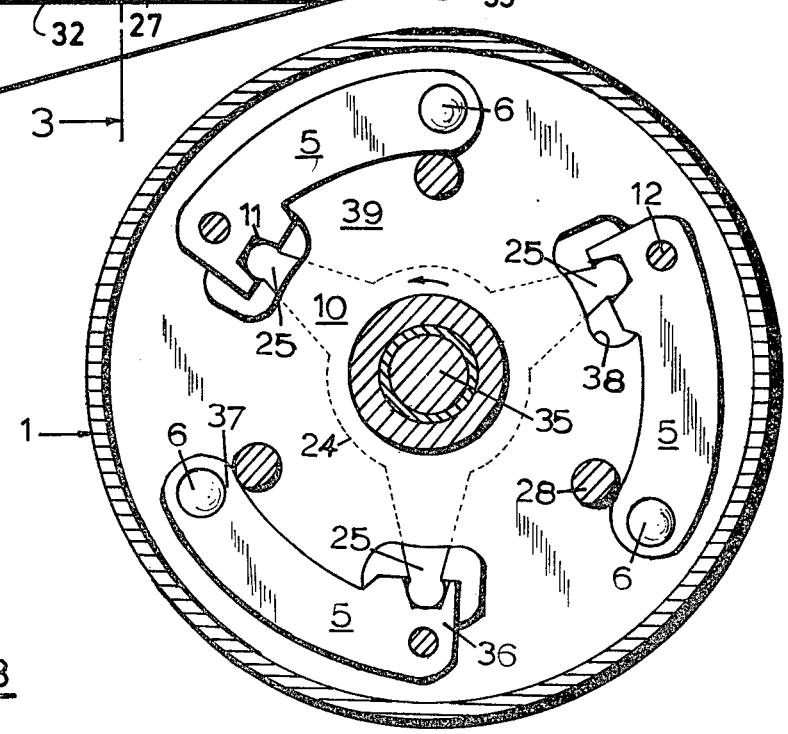
FIG. 3 is a view in cross section of the gearing showing in elevation the feedback coupling, the section being taken generally along line 3—3 in FIG. 2.

For a better determination of the courses of $P_{pk}$, $P_{Ik}$ and $P_{IIk}$ the following parameters have been chosen:

2. speed stage $v_{22} = 51.2$ km/h $v_{p2} = 23$ km/h $x_2 = 0.65$
3. speed stage $v_{23} = 80.6$ km/h $v_{p3} = 36$ km/h $x_3 = 0.65$
4. speed stage $v_{24} = 128.6$ km/h $v_{p4} = 50$ km/h $x_4 = 0.65$ Turning now to FIGS. 2 and 3, there is there shown a two-stage automatic transmission gearing in accordance with the invention. Such gearing which is shown as constituting one assembly unit, is interposed between the crankshaft 13 of an automobile engine and an output shaft 9, the transmission gearing shown in FIG. 2 having two similar stages A and B connected in series. The same reference characters are employed for designating corresponding parts in the two stages.

Driving power is transmitted from the crankshaft 13 via a conventional starting centrifugal friction clutch 14, clutch 14 being interposed between fly wheel 15 secured to the crankshaft 13 and a driven disc 16, coaxial of the fly wheel. The disc 16 is mounted for rotation with respect to a free shaft 35 which is mounted in the transmission gearing housing coaxial of the crankshaft 13. The disc 16 has a sleeve-like hub which extends to the right in FIG. 2, such hub having affixed thereto the input gear 7 of the planetary transmission gearing unit 4 of stage A. Gear 7 is in constant mesh with the left-hand gear of the composite planetary gearing unit 4, unit 4 being mounted for rotation upon a stub shaft 40 which is fixedly secured at its left-hand end to a carrier 19 which is mounted for rotation in one direction only about the shaft 35. The carrier 19 is locked against reverse rotation by a free-wheeling or one-way clutch 20. Extensions 30 of the fixed part 31 of the one-way clutch 20 are engaged in longitudinally extending recesses 32 of the housing 33 of the transmission gearing. The fixed part 31 of the one-way clutch 20 is guided in the radial direction by a circular cylindrical surface 34 of the clutch 20.

A drum 1 is supported coaxial of the shaft 35 for rotation thereabout on a disc 39. Within the drum 1 there is disposed a multi-plate gear change clutch 2 which has a plurality of alternating carrier discs 21 and driven discs 22. The carrier discs 21 rotate with carrier 19, being axially slidable with respect to a part 19' of the support 19 and being rotatable therewith about the shaft 35. The driven discs 22 are drivingly connected to the drum 1, the torque transmitted through clutch 2 between support 19 and the drum 1 being controlled by axial adjustment of a controlled disc 27 which is constantly urged in a clutch-disengaging direction to the right by a dished spring 26.

A mechanism 23 is provided in each of stages A and B to furnish power feedback coupling between such stage and the succeeding stage or the output shaft 9 of the transmission, as the case may be. Mechanism 23 comprises an output part 24 having three radially outwardly erected equally angularly spaced arms 10, as shown in FIG. 3. Mechanism 23 also comprises a plurality of regulation parts 5 (three shown), and a rest stop 28 for each of parts 5. Each part 5 is pivotally mounted by a pivot pin 12 upon the disc-like member 39 to the outer edge of which the drum 1 is integrally connected. The rest stops 29 are also mounted on the member 39. The output part 24 of stage A is fixedly connected to the input gear 7 of stage B; the output part 24 of stage B is connected to the output shaft 9 by a suitable coupling, as shown.

Each of the regulation parts 5, which is in the form of a bell crank, has a first, short generally radially directed arm 36 having a recess with opposed surfaces 11, such recess receiving the rounded end 25 of the respective arm 10 of output part 24. As shown in FIG. 2, the outer ends of arms 10 extend through windows 38 in the member 39. The other arm 37 of the regulation member 5 extends generally circumferentially of the member 39 and within the drum 1, adjacent the outer end of the arm 37 of each of members 5 there is a seat within which is rotatably mounted a centrifugal weight in form of a ball 6. When the apparatus shown in FIGS. 2 and 3 is at rest, the outer ends of the arms 37 of members 5 is in engagement with its respective rest stop 28.

As shown in FIG. 2 each ball 6 is interposed between a radially elongated annular seat 41 in the inner surface of the member 39, and a seat 29 in the right-hand end of the controlled disc 27. The seat 29 is inclined to the right in a radially outward direction, so that as the balls 6 swing outwardly under the influence of centrifugal force when the mechanism is in operation, an increased speed of rotation of the part 10 causes the balls 6 mounted thereon to travel radially outwardly, thereby further compressing the stack of discs 21, 22 of the clutch 2, and thus decreasing the slippage through the clutch between the support 19 and the drum 1.

In accordance with the present invention, not only is the radial position of the balls 6 responsive to changes in speed of rotation of the drum 1, but it is also responsive to the opposing force exerted upon each respective swinging carrier 5 by engagement between the outer end 25 of the respective arm 10 and the surfaces 11 on the arm 36 of carrier 5. It will be seen that such two forces, centrifugal force on the one hand and the torque exerted upon each swinging carrier 5 by the respective arm 10 of the output part 24, oppose each other. It will also be seen that the return spring 26 tends to urge the balls 6 radially inwardly with respect to the shaft 35 by reason of the direction of inclination of the seat 29 in the controlled disc 27. Thus, due to the force transmitted by the output arm 36 to the carrier arms 10 according to the magnitude of the torque at the output of the planetary gearing or of following planetary gearings of following stages, the effect of centrifugal force upon the weights 6 and thus of guiding arms 37 of the swinging carriers 5 is reduced as such torque increases, thereby controlling the regulating parts 5.

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is:

1. In an automatic planetary gear transmission comprising a driving shaft, a driven shaft, and at least one gearing stage, the improvement wherein each stage has a planetary gearing unit and a centrifugal gear change clutch, each unit comprising an input gear, an output gear, a planetary gear meshing with the input gear and the output gear, and a rotatable carrier for the planetary gear, the centrifugal gear change clutch being connected between the carrier and the output gear, the centrifugal gear change clutch being so constructed and arranged as to decrease the difference in speed between the carrier and the output gear upon an increase in speed of rotation of the output gear, and means to increase the difference in speed between the carrier and the output gear upon the subjection of the output gear to an increase in its driving torque.

2. An automatic planetary gear transmission having a plurality of serially connected transmissions as claimed in claim 1.

3. A multi-stage automatic planetary gear transmission as claimed in claim 2, wherein each unit comprises from and including one to three planetary gears.

4. In an automatic planetary gear transmission comprising a driving shaft, a driven shaft, and at least one gearing stage, the improvement wherein each stage has a planetary gearing unit and a centrifugal gear change clutch, each unit comprising an input gear, an output gear, a planetary gear meshing with the input gear and the output gear, and a rotatable carrier for the planetary gear, the centrifugal gear change clutch being connected between the carrier and the output gear, the centrifugal gear change clutch being so constructed and arranged as to decrease the difference in speed between the carrier and the output gear upon an increase in speed of rotation of the output gear, means to increase the difference in speed between the carrier and the output gear upon the subjection of the output gear to an increase in its driving torque, and a centrifugal starting friction clutch inserted between the driving shaft and the first gearing stage.

5. In an automatic planetary gear transmission comprising a driving shaft, a driven shaft, and at least one gearing stage, the improvement wherein each stage has a planetary gearing unit and a centrifugal gear change clutch, each unit comprising an input gear, an output gear, a planetary gear meshing with the input gear and the output gear, and a rotatable carrier for the planetary gear, the centrifugal gear change clutch being connected between the carrier and the output gear, the centrifugal gear change clutch being so constructed and arranged as to decrease the difference in speed between the carrier and the output gear upon an increase in speed of rotation of the output gear, and means to increase the difference in speed between the carrier and the output gear upon the subjection of the output gear to an increase in its driving torque, the centrifugal gear change clutch comprising a drum fixedly connected to the output gear, the drum being provided with a mechanism for feedback coupling, said mechanism comprising an output part, a movable regulating part, and a rest stop for the regulating part, the output part comprising carrier arms transmitting power from said stage, and swinging carriers pivotally mounted on the drum, the swinging carriers having output arms and guiding arms, the output arms having contact faces engaging the carrier arms, the regulating part comprising centrifugal weights guided by the guiding arms of the swinging carriers, a controlled disc with seats receiving the weights, each seat having an inclined surface, and a return spring, said return spring clamping the centrifugal weights between the inclined surface of the controlled disc and the drum of the gear change clutch.

* * * * *